Oct. 31, 1967   W. N. KING ETAL   3,349,459
METHOD OF MAKING PLASTIC TUBES
Original Filed Oct. 19, 1964   4 Sheets-Sheet 1

INVENTORS
WILLIAM N. KING
EDWARD E. MERRITT
BY

Braddock & Burd
ATTORNEYS

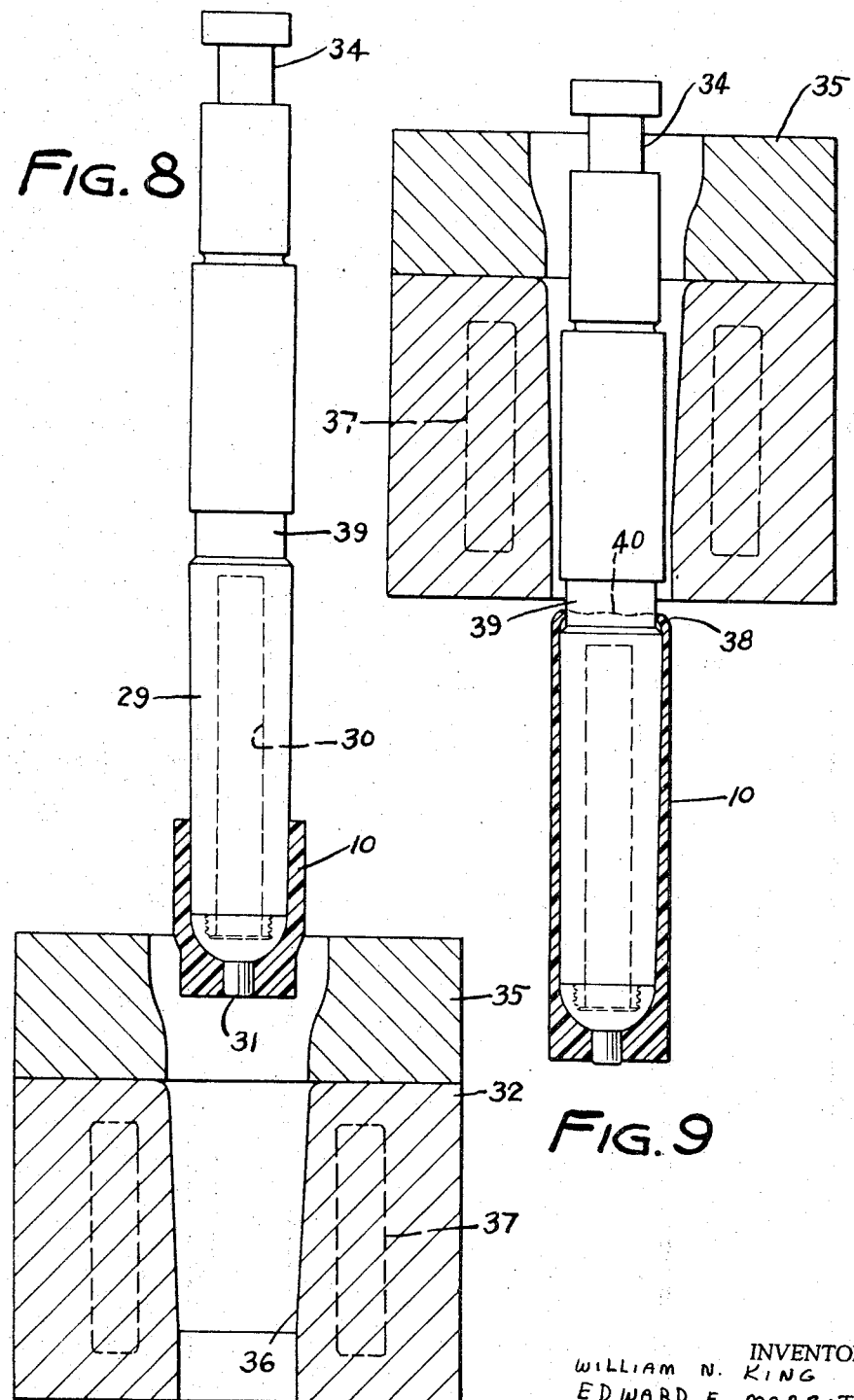

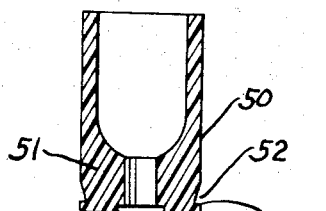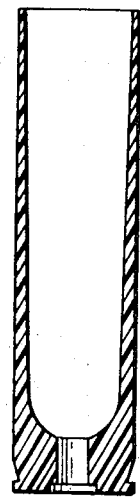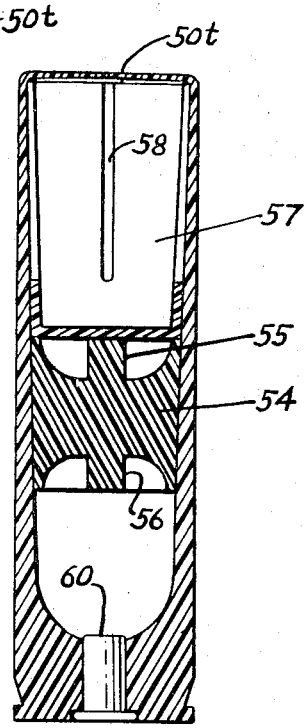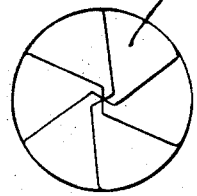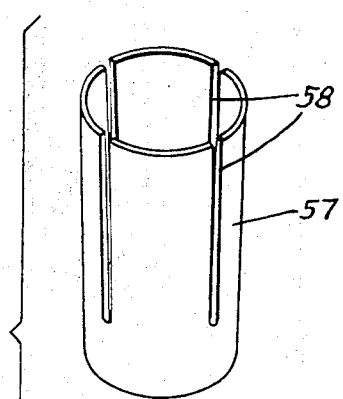

Oct. 31, 1967  W. N. KING ETAL  3,349,459
METHOD OF MAKING PLASTIC TUBES
Original Filed Oct. 19, 1964  4 Sheets-Sheet 4

INVENTORS
WILLIAM N. KING
EDWARD E. MERRITT
BY
Braddock + Bund
ATTORNEYS

United States Patent Office 3,349,459
Patented Oct. 31, 1967

3,349,459
METHOD OF MAKING PLASTIC TUBES
William N. King and Edward E. Merritt, Anoka, Minn., assignors to Federal Cartridge Corporation, Minneapolis, Minn., a corporation of Minnesota
Original application Oct. 19, 1964, Ser. No. 404,662, now Patent No. 3,284,560. Divided and this application Dec. 30, 1965, Ser. No. 536,931
2 Claims. (Cl. 29—1.3)

This application is a division of copending application, Ser. No. 404,662, filed Oct. 19, 1964, now Patent No. 3,284,564, issued Nov. 8, 1966, which, in turn, is a continuation-in-part of Ser. No. 132,742, filed Aug. 14, 1961, now abandoned.

This invention is a novel plastic shot shell case that incorporates the tube of the shell case and the base wad in an integral plastic unit, the tube of which is drawn or stretched precisely in two directions to strengthen it while controlling wall thickness within tolerances necessary for it to serve its purpose. Invention also resides in forming the ejector gripping portion as a recess in the shell head to provide a commercially feasible rimless shot shell.

While making the tubes of shot shells from plastic has long been a dream of shot shell manufacturers, it is only recently that the technique for making plastic tubing that was strong enough to make good shot shell cases became a reality. Even in those cases where the tubes of shot shells are made of this strengthened plastic, they are still tubular in form and thereby continue to have one of the principal drawbacks of the old paper tube shot shells. Any shot shell that uses a tube open at both ends requires a conventional base wad and will have difficulty with gas leakage through or past the base wad. The base wads, which surround the priming cap in shot shells and theoretically seal the gases formed by the burning powder in them, have taken countless forms. Regardless of the manner in which they are made, however, they are invariably subject to a certain amount of gas leakage from the high pressures generated when the shell is fired. Any shell employing a conventional base wad structure of the rolled paper type or any type of material that is formed of pieces rolled or pressed together will unravel or confetti in due time. Confettiing is a colloquialism used in the trade to describe the tendency of base wad to tear apart into tiny pieces comparable to confetti. This material may be carried into the barrel of a gun and must be cleaned out regularly. Whenever there is any unravelling, confettiing or other distortion of the base wad, gas leakage is possible.

The base wads either leak around their edges or, in the case of wadding made of compressed layers of paper or wood pulp and the like, they may even leak through their body structure. These escaping gases stretch the metal cap surrounding the base of the shell and particularly its rim portion. When a metal cap at the base of the shell is distorted sufficiently by leaking gas pressures, the shell causes difficulty in weapons since the ejecting and extracting mechanisms are sometimes inadequate to remove these distorted shells from the chamber. Most frequently, the ejecting mechanism fails to eject the shell that has been extracted by the extracting mechanism. Less frequently, but equally bothersome, is the failure of the extractor to start the shell out of the shell chamber so that the ejector can finish exhausting it from the gun chamber. In either case, the shell is not removed completely from the chamber. When a shell is not properly extracted and ejected from a gun, jamming of the mechanism results. These difficulties occur whether the shells have plastic tubes that have been biaxially oriented or not if a conventional base wad is used. No such leakage, distortion and resulting difficulties occur with the integral base wad and tube of thermoplastic, The failure of the gun to properly extract and eject the shell is seldom a problem when the shell is a new one. People who use a great many shells, however, as for example trap shooters, find that they can save considerable amounts of money by reloading their shells. Others also sometimes prefer to load their own shells in order to create special loads and charges for specific purposes for which commercially produced shells are not readily available. It is these shells that are reloaded which are the ones likely to cause difficulty.

Another problem encountered by the prsent day manufacturer of shot shells is that of having sufficient space within the shell tube to provide the necessary charge and load for some of the heavy hunting loads or magnum loads, as they are called. These magnum loads are provided wtih an increased amount of load or shot which calls for increased powder. At the same time, there is a very definite overall limit to the length which the shot shell may be, dictated by the size of gun chambers and mechanisms in repeating and semiautomatic equipment. Consequently there is a constant pressure to provide more room within the shot shell to accommodate more material. This problem is not solved by a mere substitution of a plastic tube for a paper one.

Also, shells made with a plastic tube substituted for a paper tube but otherwise constructed in substantially the same manner as paper shell tubes require nearly as many steps to make, as do the paper shell tubes. Hence, shot shells made with open ended plastic tubes substituted for paper ones are nearly as expensive to manufacture as paper tube shells.

Yet another problem facing the manufacturer of the modern day shell is the fact that as the loads get heavier and the charge is made bigger in order to drive the loads with killing power for longer distances, the pressures generated against the attachment of the metal head to the tube become greater. In any shot shell, except one constructed as disclosed herein, the head must resist this pressure in part, since the head essentially closes the end of the tube and provides the support for the base wad. Hence, the greater force generated by the shell, the greater the strain placed on the connection between the tube and the head. For this reason, conventional heads generally are of substantial strength and length in order to provide a good bond between the head and the tube.

For the same reasons noted above with respect to requiring more space within the shot shell itself and the need for a strong head, these heavily charged modern day shell loads also require extremely consistent tube wall strength, particularly near the outer end. Molded plastic used in early attempts to substitute plastic for paper in shot shell tubes usually failed near the outer end, and a portion of the shell tube was carried away as the shell was discharged. While a technique for strengthening plastic has been discovered which renders it adequate for this usage, the known method does not produce the consistency in side wall dimensions that permits an approach to minimum wall thickness.

It is true that it has been proposed heretofore to have biaxially oriented plastic shot shell tubes, but as far as is known they are used only to replace paper tubes. Accordingly they employ conventional base wad construction. In the alternative, it has been proposed to mold plastic shells with an integral base wad and tube but without offering any method or means or even suggesting biaxially orienting the tube of an integrally molded shell tube and base wad after the molding is done. The prior art teachings have been available to inventors for some time without anyone else proposing that they be combined into a single shell such as that disclosed here. Hence the present structure is the first offering of this combination of structures which represents a tremendous advance over previously available shells.

Since our original disclosure, it has occurred to us that the use of the combination integral base wad portion and tube portion also creates the possibility of forming a rimless shot shell. Since in this structure where the base wad and the tube are formed integrally from a thermoplastic the tube of which has been stretched both axially and longitudinally, the base wad and tube are capable of absorbing the entire pressure generated when the shell is fired unassisted by a metallic cap, it is not necessary to have a metallic head for strength and hence an ejecting groove may be formed in the base wad material. When making a rimless shell, the base wad is made adequately long to assure necessary strength in the base wad portion. Heretofore a rimless shot shell has been considered not feasible commercially if not actually impossible to make.

Accordingly, it is an object of this invention to provide a novel plastic shot shell case.

It is another object of this invention to provide a plastic shot shell case in which the shell tube is biaxially stretched and an integral base section of the tube replaces the base wad.

It is a further object of this invention to provide a novel shot shell in which substantially none of the force generated in firing the shell is applied to the metal head thereof.

It is yet a further object of this invention to provide a plastic shot shell that can be reloaded successfully a greater number of times than any shell using a separate base wad.

It is a still further object of this invention to provide a novel shot shell case that offers greater flexibility in the amount of shot and powder used within the shell case of a given length.

Another object of this invention is to provide a shot shell in which the metal head thereof may be of less strength and smaller size than in previous shot shells or even eliminated.

It is a still further object of this invention to provide a method of making plastic tube shot shells in which the stretch applied to the plastic tube is well controlled.

Yet another object of this invention is to provide a method of making thermoplastic tubes of limited length but having wall thicknesses within very close tolerances.

A further object of this invention is to provide a method of making plastic shot shell tubes that is less expensive than prior methods of making shot shells.

An additional object of this invention is to provide a rimless shot shell.

Yet another object of this invention is to provide an improved method of making plastic shot shell cases in which the strength gained by stretching the plastic may be of maximum amount.

A still further object of this invention is to provide a plastic shot shell having a crimped end closure that can be manually reloaded.

Yet another object of this invention is to provide a plastic shot shell having greater resistance to damage by water and temperature.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 8 is a side elevation of the male draw die together with a vertical section of the basic plug shown in FIGURE 1, and the female draw die ready to begin the drawing operation; broken lines illustrate hidden parts;

FIGURE 9 is a view similar to FIGURE 8 after the male draw die has been forced through the female draw die, thus forming the structure shown in FIGURE 2 and before the stripper has taken the plastic shot shell case off the male die; broken lines again illustrate hidden parts;

FIGURE 10 is a modified form of cup drawn to the scale used in FIGURE 1;

FIGURE 11 is a vertical section through a modified form of shell tube formed from the cup shown in FIGURE 10 drawn to the same scale;

FIGURE 12 is an enlarged vertical section through a shell such as that shown in FIGURE 11 with the wad and shot pouch shown in FIGURE 14 installed; FIGURE 12 is drawn to the same scale as FIGURE 6;

FIGURE 13 is a top view of the structure as it appears in FIGURE 12 and drawn to the same scale as that figure;

FIGURE 14 is an exploded perspective view of the separable wad and shot pouch; FIGURE 14 is drawn to the scale of FIGURE 12;

Figure 1:
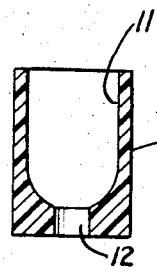
FIGURE 1 is a vertical sectional view of the original plastic molding from which the shot shell case is made.

In FIGURE 1, the original piece of molded plastic that will become the base wad and shell tube is shown at 10. This blank may be made in any suitable manner as by injection molding, for example, and the material used is any suitable thermoplastic material of which high density polyethylene (having a density on the order of 0.942 to 0.965), polypropylene, related polyolefins, being examples. These materials and a thermoplastic sold by Eastman Chemical Corporation under the trademark "Polyallomer," the generic description of which is not presently known, may be formed, preferably molding or cutting into discs that are formed into cups or molded directly into cups and then further formed into the shot shell case. The blank 10 is provided with a well 11 and an opening at the bottom 12. The well 11 receives the male draw tool or punch while the opening 12 aids in stabilizing the cup on the punch and, in the finished shell case, receives the priming device or cap.

Figure 2:
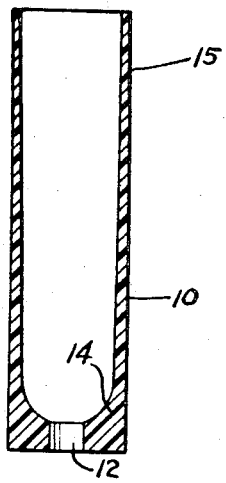
FIGURE 2 is the same piece after it has been put through the draw dies; it is drawn to the same scale as FIGURE 1.

In FIGURE 2, the blank 10 is shown as having been drawn by being passed through the draw dies and thereby having formed therein the finished opening 12 for receiving the priming cup and the base wad portion 14 which will resist pressures generated by the powder as it drives the charge out of the shot shell case.

The walls 15 of the tube will be seen to be tapered toward the mouth of the tube. The principal reasons for doing this are to increase biaxial orientation near the mouth of the tube, thin the wall for crimping and incidentally to provide a form of tube that can be removed easily from the male draw die. At any given elevation of the tube, however, the wall thicknesses are exactly the same all around the tube that will eventually receive the powder and shot.

Figure 3:
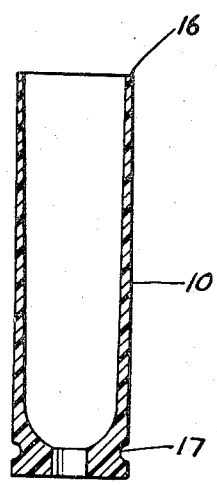
FIGURE 3 is the same structure shown in FIGURE 2 after the piece has been trimmed and grooved ready for assembling to the head of the shot shell.

In FIGURE 3, the tube 10 has been trimmed at the upper end 16 to appropriate length and a groove 17 formed therein which provides an exceptionally secure means for fastening the metal head to the plastic tube.

Figure 5:
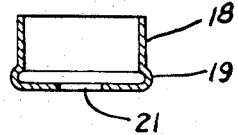
FIGURE 5 is a shot shell case head in its first formation prior to being assembled to the shot shell case; it is drawn to the same scale as FIGURES 1, 2, 3 and 4.
Figure 4:
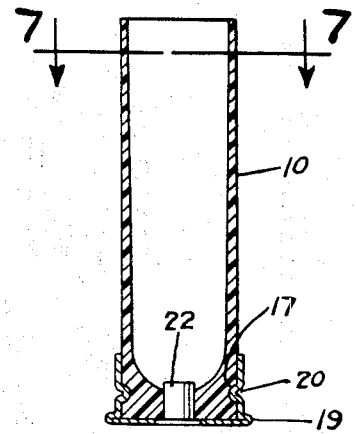
FIGURE 4 is a vertical section through a completed shot shell case drawn to the same scale as FIGURES 1, 2 and 3.

In FIGURE 5 is seen the head 18 partially formed and ready to be placed on the shot shell tube 10. The partially formed rim 19 is already set at this stage of the operation and when the head 18 is engaged with the base of the shot shell tube 10, the rim 19 is crimped down into its final form as seen in FIGURE 4. The portion of the metal as at 20 is also rolled into the notch 17 thereby securely attaching the metal head to the butt end of the shot shell tube. Head 18 also has an opening 21 in its bottom which aligns with the opening 12 in the shot shell tube in order to receive the priming device 22. FIGURE 4, therefore, illustrates a completed shot shell ready to be loaded.

Figure 6:
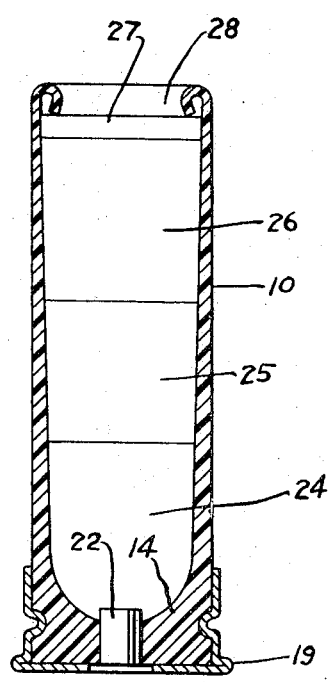
FIGURE 6 is an enlarged, diagrammatic, vertical section through a completed shot shell.
Figure 7:
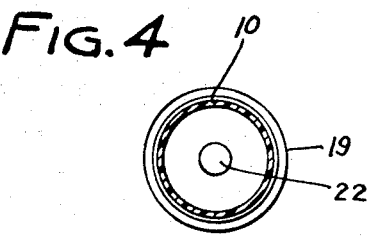
FIGURE 7 is a horizontal section taken on the line 7—7 of FIGURE 4 and drawn to the same scale as that figure.

The loaded shell is illustrated in FIGURE 6 where the powder charge is merely designated by the area 24, a suitable cushion wad such as that disclosed in U.S. Patent 2,759,852, by area 25 and the space reserved for shot 26. Any suitable top wad 27 such as the one made by the method disclosed in U.S. Patent 2,599,943 closes the end of the tube and the tube is crimped as at 28 in the traditional manner to hold top wad 27 in place. The mouth of the tube may also be appropriately closed by the folded or wadless method in which the mouth of the tube is closed entirely by a portion of the tube itself as shown in FIGURES 10–13.

The base wad portion 14 in this shell may be on the order of only .188 inch thick from the inside bottom of the metal cap to the inside of the tube adjacent to the primer device. Nevertheless, because base wad portion 14 is formed integrally with the side walls of the shell, there was no head distorting gas leakage when these shells are fired. The length of conventional base wads that would be used in a shell for which a base wad of .188 inch is provided in the shell disclosed, would range from .281 up to .625 inch. Not only is this integral base wad more efficient in sealing the gases within the shot shell tube, therefore, it also provides from 1/10 to 1/2 inch more space within the shot shell tube for the placement of powder charge and other loading materials.

The method of forming these integral base wad and tube shot shells is best understood from a consideration of FIGURES 8 and 9. The method may be carried out at either room temperature, hereafter called cold, or at elevated temperatures or hot drawn.

In the latter method, the original thermoplastic molding or cup 10 is first heated to a maximum temperature without destroying crystallization. This is the temperature at which the material is most easily stretched in two directions to provide the molecular alignment that imparts the greatest tensile strength. These temperatures for the various thermoplastics that might be employed herein are well known and hence not set out here. When the material used is a high density polyethylene (also known as linear, straight-chain or low pressure polyethylene and having a density of 0.942 to 0.965) of a type such as that sold by Hercules Powder Company under the trademark "Hi-Fax" and specifically the 1800 type, this temperature is known to the 124° C. to 125° C. The Eastman Chemical material "Polyallomer" has about the same requirements. The process will be described using this material as an example, it being understood that other materials could be substituted and altered temperatures, etc. may be used as required. Heating cup 10 prior to forcing the male draw tool 29 into it may be by any suitable means as by passing it through a warm air heating oven. The electrical heating element 30 in the male draw tool aids in maintaining this temperature. As the cup is substantially smaller on the inside than the male draw tool or punch 29, the cup is expanded in a radial direction a considerable amount when the punch is forced into it.

After the male draw tool 29 has been forced into cup 10, the male draw tool is forced through the female draw die 32 by any suitable means such as the hydraulic press or the like. The male draw tool is provided as at 34 in FIGURES 8 and 9 with suitable means for attaching it to a press. Guide block 35 positioned above the female draw tool 32 guides the cup 10 carried on the male draw tool down into the tapered portion 36 of the female draw die. The female draw die is also heated in some suitable manner as by the heating coils 37. The draw tools are therefore maintained also at the proper temperature for the particular thermoplastic being used.

As the male draw die is forced through the female draw die, the walls of cup 10 which are too thick to pass through the female draw tool or die when stretched over the punch, are elongated along the punch until the upper end 38 of the plastic material enters the stripper groove 39 on the male draw tool 29. This is seen in FIGURE 9 where the punch has been forced entirely through the draw die having clearance for a conventional stripper to engage the punch.

With the stripper engaged, the male draw tool is withdrawn through the female draw tool and the drawn shot shell tube is stripped off the punch by the stripper. The male draw tool is tapered slightly which produces the tapered walls of the tube 10. The principal reasons for tapering the male draw die is to provide maximum biaxial orientation at the mouth of the shell and to facilitate stripping the drawn shells therefrom. As shown in FIGURE 9, the structure produced is approximately that of FIGURE 2. The shell has actually been drawn somewhat longer than is necessary to make the finished shot shell tube so that its end, which may be and usually are somewhat irregular as shown by the broken line 40 in FIGURE 9, may be trimmed off evenly.

The trimming and grooving of the drawn shot shell shown in FIGURES 9 and 2 is accomplished by suitable means not here shown nor described in detail as not per se invention herein. The scrap material from this trimming and grooving process may be mixed in limited quantities with fresh material and used to produce additional shot shell tubes.

In our earlier copending disclosure, we indicated the necessity to heat the thermoplastic to a maximum temperature of crystallization as described above. We have since discovered that the same drawing technique as disclosed in that prior application can be carried out at room temperatures. The drawback to using materials at room temperatures is that greater force is required to push the material through the dies and that somewhat greater tendency for the sides of the material to be scored or disfigured is experienced. Also the orientation and hence the strength achieved is not as great although sufficient to create a usable structure. It would also appear that the bearing supports for the dies to hold them precisely aligned when cold drawing in order to produce tapering tubes having consistent wall thickness at any given cross-sectional point along their lengths will be in excess of that required when using heated dies. It has been found that there is some variation in wall thickness when the die structures designed for hot drawing were used with cold material. The slight variation in wall thickness that occurs in this situation is believed to be caused by the lateral displacement of the male die in relation to the female die as the cup is being forced through the latter when the former is not sufficiently supported.

Cold forming has some considerable advantages, however, not the least of which is being able to operate the machine without being concerned about die temperature except to lubricate the dies to make sure that the friction heating of the dies is kept within bounds. This is even more necessary in the hot draw process which requires a lubricating solution to be used also and which complicates maintaining correct temperatures. The premolded cups are more easily handled when cold, and interruption of production does not result in loss of cup heat which is a substantial problem when using the hot draw process. When hot drawing, stopping the press requires removing cups in the mechanism, washing off the lubrication and reheating the cups. Furthermore the savings in not preheating the cups appears to at least offset the added power needed to cold draw.

As shown in FIGURES 10 and 11, the rimless shot shell made of plastic is formed in substantially the same pattern as a rimless metallic cartridge is formed. The unit is manufactured from a premolded plug 50, in FIGURE 10, of a type similar to that illustrated in FIGURES 1 through 6 but having substantially more material in the base wad portion 51 in order to provide material to allow for the formation of groove 52. This groove is formed in the usual shape of a rimless automatic weapon cartridge case with the leading edge slanting at an angle of approximately 15 degrees to the vertical and the rear surface of the groove designated 51R being substantially normal to the length of the case in order to receive the ejector mechanism. All of the more recent rifle cartridges are of the so-called rimless type for the reason that they function better in automatic and semi-automatic weapons.

The construction shown in FIGURES 10–14 also is distinct from the form shown in FIGURES 1–9 in that the top of the tube designated 50t which is used to enclose the shot in the tube is made substantially thinner than the tube illustrated in the previously disclosed form of the device. While it cannot be shown accurately in drawings of the character used for patent applications, the wall thickness at 16 in FIGURE 3 is .0225 plus or minus .001 of an inch; the thickness of the wall at 50t is from .0125 to .0150.

It is feasible to make the end of the structure shown in FIGURES 10–14 with the upper part of the tube as thin as stated by the use of what are now known as shot pouches. The particular structure shown herein comprises the concave faced wad 54 similar to that shown in U.S. Patent No. 157,793 but which in each end has a supporting central column 55. A short pouch arrangement 57 comprises a cylinder open at one end and closed at the other with vertical slits as shown at 58 dividing the upper part of the cylinder into two or more segments. The bottom of pouch 57 rests on the top of column 55 and on the edge 59 of wad 54 facing the shot pouch. This arrangement of parts may be clearly seen in the sectional view of FIGURE 12. It will be noted that the over-the powder wad 54 has a column such as the one designated 55 in FIGURE 14 in both ends, the lower one being 56 in FIGURE 12, and that the opposite faces of the entire structure are, therefore, symmetrical. The purpose of this is simply to permit the wads to be assembled in either direction into the shell case 50. The column 56 in FIGURE 12 is superflouous but harmless. The usual primer cup is designated 60.

Generally speaking, the shot pouches of the prior art have been one piece units in which a pouch such as 57 is an integral part of a sealing type wad structure. This type of a wad is difficult to handle in conventional loading machinery, however, whereas dividing the wad and pouch into two pieces that are properly oriented together, as it is assembled in the shell, lends itself readily to existing equipment. Protecting the shot shell case with the use of the shot pouch in and of itself is not inventive. However, in a plastic shot shell case, use of the pouch makes it possible to draw the upper end 50t of tube 50 as thin as specified above without the likelihood of destroying the end of the shell tube beyond reuse when the shell is fired. On the other hand, however, by having the end of the tube as thin as set out above, it is possible to reload such a plastic shot shell in hand loading equipment, even though the end crimp type of closure is used where the separate wad is eliminated. With the tube earlier disclosed and described in FIGURES 1–9, the wall thickness of .0225 is such as to make it very difficult to recrimp the end using hand loading equipment. In this respect, no plastic shell until now has been as satisfactory as paper tube shells. With crimped end paper shot shell tubes, the paper takes a set which makes it easy for a hand loader to refold the crimp following the lines formed in the paper by the machine loading in the first instance. In the case of plastic shells, however, the combination of the heat of discharging of the shell and the force of the shot passing out of it, tend to eliminate the preformed creases in the thermoplastic so that the hand loader must reform his own crimps which is difficult or even impossible with hand loading equipment. Such shells can be reloaded at the factory but many shooters prefer to reload their own shells, and heretofore it was substantially impossible with plastic tube shells.

Figure 15:
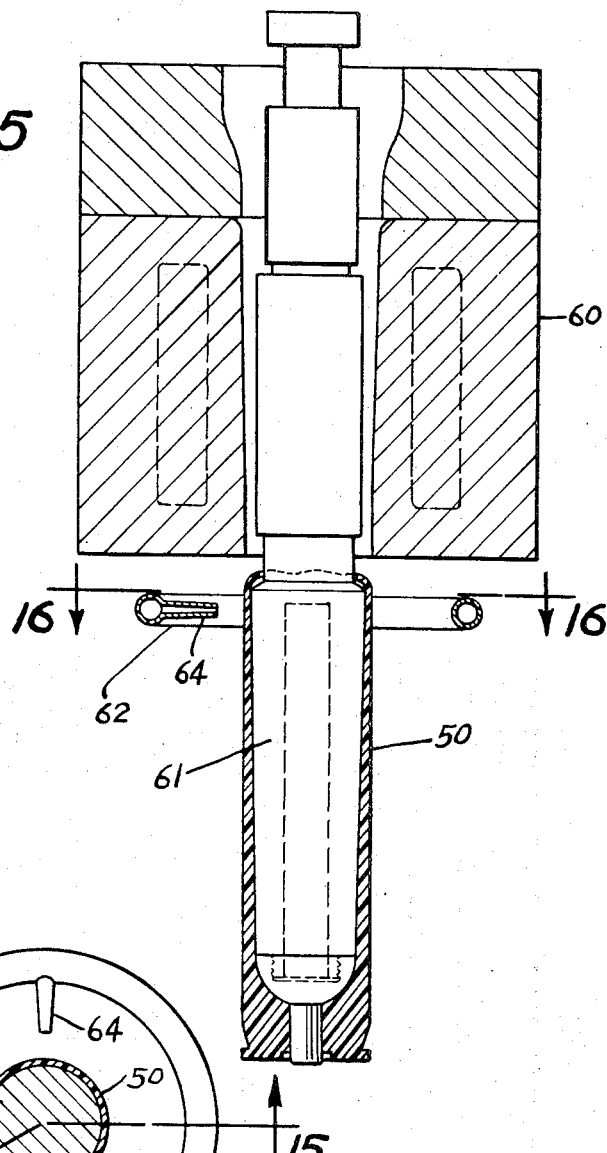
FIGURE 15 is a view similar to FIGURE 9 and drawn to the same scale but showing a modification of structure illustrated in FIGURE 9, being taken generally on the line 15—15 of FIGURE 16.
Figure 16:
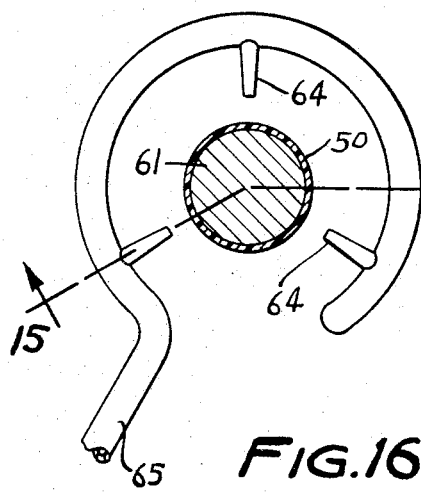
FIGURE 16 is a horizontal section taken on the line and in the direction of the arrows 16—16 of FIGURE 15 and drawn to the same scale as that figure.

We have also discovered since our first disclosure, particularly when using the hot draw process, we can obtain stronger end products if a cooling solution is sprayed on to the tubes as they eject from die structure. As shown in FIGURE 15, the female die may be substantially identical to that shown earlier but the female die of FIGURE 15 is here given a separate number 60 to distinguish it clearly from the previously illustrated structures. The male die 61, however, is made with a slightly greater diameter at the top end so that case 50 is drawn more thinly at the top as discussed above.

Any suitable structure such as the hollow pipe C-ring 62 embraces the opening in female die 60 from which the shot case 50 and male die 61 protrude as the draw is completed. A plurality of nozzles such as seen at 64 communicate with the interior of the hollow C-ring 62. A cooling solution may be pumped in from any suitable pump via the connecting pipe 65, and cooling solution sprays on to the shot shell case from three directions giving substantially complete coverage. It has been discovered that the strength provided by biaxial orientation is maintained at a higher level when the case is immediately cooled upon emerging from the female die 60 and particularly at the hot draw process.

While the method imparting both radial and longitudinal stretching to plastic tubing having one end at least partially closed has been described as used in making shot shells, it is obvious that any application that might be made of plastic tubes requiring greater strength that is achieved by injection molding and of limited length could use the process described herein. This method of making tubes or cups of limited length but extremely consistent wall thickness might also be applied to any thermoplastic whether or not such treatment increased its strength, providing the material remained strong enough to achieve its intended function after being drawn.

The advantages of these plastic shot shells in manufacture as compared to a conventional tube shot shell whether of paper or plastic tube is very clear from the following table. Under the heading "Integral Base Wad and Tube Plastic Shell" are listed the steps or processes necessary to produce the shot shell of this invention. Under the heading "Conventional Tube Shell" are listed the steps necessary for producing that type of a shot shell. The metal heads and tube portions of course are actually being made simultaneously and are not consecutive steps. Note that it is not only easier to produce the integral base wad and tube shot shell itself, but that it is also less burdensome to form the metal head for it because it may be shorter and does not require the draw and trimming steps.

COMPARISON OF STEPS FOR MAKING INTEGRAL TUBE AND BASE WAD PLASTIC AND CONVENTIONAL CONSTRUCTION SHOT SHELLS

| Integral Tube and Base Wad Plastic Shell | Conventional Tube Shell | |
|---|---|---|
| | Paper | Plastic |
| 1. Cup | 1. Roll tube | Extrude plastic. |
| 2. Draw | 2. Dry | (Omitted.) |
| 3. Trim and groove | 3. Size | Stretch plastic. |
| 4. Head or assemble | 4. Cut to length | Cut to length. |
| 5. Primer | 5. Wax | (Omitted.) |
| 6. Load | 6. Insert base wad | Insert base wad. |
| | 7. Head or assemble | Head or assemble. |
| | 8. Primer | Primer. |
| | 9. Load | Load. |

To make the metal cap or head for the two types of shells, the following additional steps are necessary—

| 7. Blank and cup | 10. Blank and cup |
|---|---|
| 8. Stamp and preform | 11. Draw |
| | 12. Trim |
| | 13. Stamp and preform |
| | 14. Knurl |

In the case of the all plastic shell of FIGURES 10–16, steps 4, 7 and 8 are omitted from the required steps for production of the shell disclosed herein.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A method of making shot shell cases comprising, molding a cup of thermoplastic, stretching the cup radially, stretching the cup longitudinally, trimming the end of the stretched cup and grooving the base thereof, preforming a metal head therefor, fitting the metal head on the end of the stretched cup having the groove therein, finish forming an ejection rim on the metal head and deforming a portion of said metal head into the groove of said stretched cup simultaneously.

2. The method of claim 1 in which the cup is heated before stretching and cooled immediately thereafter.

References Cited

UNITED STATES PATENTS

| 297,712 | 4/1884 | Peters | 18—24 |
| 3,099,958 | 8/1963 | Daubenspeck | 29—1.3 |
| 3,159,701 | 12/1964 | Herter | 264—328 |
| 3,164,090 | 1/1965 | Williams | 102—43 |
| 3,171,350 | 3/1965 | Metcalf | 102—43 |
| 3,176,614 | 4/1965 | Woodring | 102—43 |
| 3,284,560 | 11/1966 | King | 264—292 |

RICHARD H. EANES, JR., *Primary Examiner.*

UNITED STATES PATENT OFFICE
CERTIFICATE OF CORRECTION

Patent No. 3,349,459  October 31, 1967

William N. King et al.

It is hereby certified that error appears in the above numbered patent requiring correction and that the said Letters Patent should read as corrected below.

Column 1, line 3, after "in turn," insert -- is a division of copending application Serial No. 309,824, filed September 18, 1963, which in turn, --; column 2, line 11, for "prsent" read -- present --; column 5, line 8, for "reecive" read -- receive --.

Signed and sealed this 12th day of November 1968.

(SEAL)
Attest:

Edward M. Fletcher, Jr.
Attesting Officer

EDWARD J. BRENNER
Commissioner of Patents